United States Patent Office 3,389,094
Patented June 18, 1968

3,389,094
FOAMING PHENOL-FORMALDEHYDE RESINS WITH FLUOROCARBONS
William J. D'Alessandro, Old Bridge, N.J., assignor to Union Carbide Corporation, a corporation of New York
No Drawing. Filed Oct. 10, 1963, Ser. No. 315,394
20 Claims. (Cl. 260—2.5)

ABSTRACT OF THE DISCLOSURE

Closed-cell phenolic foam structures of fine cell size are provided by foaming a phenol-formaldehyde resin containing less than 10% water with a polyhalogenated fluorocarbon. Other additive resins may also be present as can be other foaming agents.

---

This invention relates to the production of improved low density multicellular foamed structures of thermoset phenolaldehyde condensates. More particularly, the invention relates to improved phenolic foams having a high resistance to friability and resistance to combustion.

Heretofore, it has been known that thermoset phenolic resin foam structures can be prepared by the addition of an acidic catalyst to a heat-hardenable phenol-aldehyde one-step resin, commonly called "resole" resins. Upon the addition of the acidic catalyst to the resole resin, an exothermic reaction of sufficient magnitude occurs to convert the water of condensation and any water initially present to steam. The steam, being fairly uniformly distributed throughout the resin foams the reacting resin into a frothy mass and because of the rapid exotherm, the resin converts quickly into an infusible condition before the froth can collapse to any significant extent due to the condensation of steam.

The foam produced is of significantly inferior quality in being open-celled and subject to cavitation caused by "blow-holes" or channels formed by the escaping steam. The foam is of non-uniformly textured open-cells and is of higher density and higher porosity than that acceptable to the trade. It is also of low compressive strength and highly subject to mechanical abrasion. In fact, it is readily abraded by finger pressure.

Attempts have been made previously to improve these foams. Blowing agents such as carbon dioxide-liberating compounds such as sodium bicarbonate have been employed to control cell structure but without significant success. Various organic blowing agents, particularly the volatile liquid agents such as lower aliphatic alcohols and alkyl ethers, as well as diazo compounds have been used generally in combination with a non-ionic surface active agent, with some improvement but also without complete commercial acceptance of the product. The use of small amounts of aliphatic alcohols, for instance, yields a predominantly coarse cellular structure whereas acetone gives a variable structure of large and small cells, and of high porosity. This again is caused by the "open-celled" or connecting nature of the cells. The use of low boiling aliphatic ethers improved the foams significantly in producing a more uniform cellular texture of the foams even though open-celled but the foams are not as resistant to abrasion as is necessary for many applications. Such structures have little resistance to rubbing and the susceptibility to water or moisture absorption seriously decreases the insulation properties. Moreover, upon reaching temperatures of about 250° F. the foamed structures are readily subject to combustion.

The combustion of these foams limits their use as thermal insulation since they cannot pass the required flame tests. The "punking" properties of the foam, i.e., the property of continuing to glow and combust without a visible flame, in fact, made them disadvantageous for many commercial uses. The open-celled nature of the foam provides sufficient air flow to sustain combustion by the wicking tendency of the foam. Heretofore there has been no effective method or means to reduce the "punking" of the foams.

However, it has now been discovered that a substantially improved phenolic resin foam can be prepared which is nearly completely closed cell and is of such small uniform cellular structure that foams are stronger and highly resistant to abrasion and water absorption and also have much improved flame retarding ability.

These improved phenolic resin foams are now prepared in accordance with the present invention by the use of a polyhalogenated saturated fluorocarbon having an atmospheric boiling point from about −40° F. to about 200° F. as an essential foaming agent for a one-step heat hardenable phenol-aldehyde resole resin. The presence of as little as 2 parts by weight of the polyhalogenated saturated fluorocarbons per 100 parts of the resole produces a significant improvement in the quality of the resin, even though the foam is of fairly high density. The amount of the foaming fluorocarbon to be employed is, of course, dependent upon the desired density of the foam. It is preferred that for foams of a core density of 1.5 to 3.0 pounds per cubic feet, that the fluorocarbons be employed in amounts from about 5 to 10 parts by weight per 100 parts of the liquid resole resin. Foams of a core density from 0.7 to 1.5 pounds per cubic foot are best prepared using from 20 to 30 parts per 100 parts of the liquid resole resin. The use of the fluorocarbons in amounts much greater that 50 percent by weight in the foamable composition yield structures so light and weak that they are of doubtful commercial value. The most commercially attractive foams are those having a core density from about 0.2 to 20 pounds per cubic foot.

The exact cause as to why these fluorocarbon materials produce a fine uniform closed-cell structure in the phenolic foams is not fully understood, particularly since other organic hydrocarbon solvents having similar boiling points produce only open-celled foams. However, as hereinafter set forth, it is believed that a principal factor for the difference is the unusual and unique solubility phenomena of these fluorocarbons in the resole resin, particularly during the foaming of the phenol-formaldehyde resin. In contradistinction to foaming agents of the prior art, the fluorocarbons herein disclosed are uniquely soluble in the phenolic resin during the initial stages of the condensation thereof, i.e., when the resin is in the "A"-stage and early "B"-stage. Thus, uniform distribution of the blowing agent throughout the resin mix is possible, resulting in a longer vaporization period which is the probable cause of the fine cell structure of the foams. During the foaming process the fluorocarbons have been found to vaporize at a slow rate maintaining a smooth and even foaming action. As the temperature and molecular weight of the phenolic resin increases, the fluorocarbons are ultimately entrapped by the infusible high molecular weight resin in separate and distinct closed cells.

Retention of the fluorocarbon during the initial stages of foaming is further aided by the unusual effect that the fluorocarbons have upon the viscosity of the resin mix. Upon the addition of the fluorocarbon to the resole resin, there is no dilution effect and in fact there is often an appreciable incease in viscosity. Thus, a higher level of viscosity is maintained during the initial stages of curing. The level of viscosity of the resin remains much higher with fluorocarbons even during the curing of the resin foam than with other heretofore employed blowing agents. All of these other agents significantly lower the viscosity of the foamable resin composition, which stays low during the foaming and permitting these foaming agents to freely pass through the foam and form a plurality of open cells.

Thus, in prior art compositions and methods of foaming, a large amount of foaming agent was completely lost in the initial stages of a foaming, due to this relative free passage of the gaseous blowing agent through the relatively fluid foaming phenolic resin mass before the mass could set into a non-collapsible foam.

Due to the unique action of the fluorocarbon during the foaming of phenolic resins, the fluorocarbons are retained within the foaming mass during the entire foaming operation and are retained in the ultimate foamed product. With other types of organic liquids, this passage of gas is not prevented until the catalyzed condensation resin has progressed to its later stages of cure. At this point the condensation product provided the necessary viscosity to entrap the gaseous foaming agent. Due to the solubility of the fluorocarbons in the resole resins a much more uniform dispersement of the blowing agent throughout the A-stage resin is also accomplished. Although the fluorocarbons exert a higher vapor pressure, this solubility enables the fluorocarbons to maintain a slow, uniform rate of volatilization throughout the foaming action.

With the polyhalogenated fluorocarbons, it has been found that little of these agents actually pass through the foam. Consequently, unlike prior art foams, the phenolic foams provided herein are comprised of a plurality of closed, spherical microscopic cells which are not ruptured or fractured by the evolving gas. Due to the entrapment of the fluorocarbon blowing agents within the frothing mass, the phenolic foams are free of large gas pockets or voids and are of a non-porous structure that will not absorb water or moisture in any substantial amount.

The polyhalogenated, saturated fluorocarbons are unique in the formation of a multi-cellular foam-like structure, having a greater number of closed cells which are more uniform, with an extremely thin cell wall smaller than those heretofore known. The microscopic cells of the foams are spherical and uniform in cell structure. They do not have the characteristic distorted elliptical shape that is prevalent in prior art phenolic foam cells using alcohol or ether blowing agents. Wall thickness between adjacent microscopic cells, which usually ranges from about 0.003 to about 0.005 mm. in these foams, is much less than those of the prior art since the latter have a minimum thickness of about 0.018 mm. Fluorocarbon blowing agents also provide a phenolic foam with a smaller cell size. In general, these foams have an average diameter ranging from .015 to .030 mm. with a substantial portion (greater than 75%) of the cells having a diameter from .022 to .026 mm.

Also because of the physical entrapment of the polyhalogenated fluorocarbons in the closed cells of the foams, the foams have a high resistance in "punking" and to spontaneous combustion caused by high environmental temperatures or flame. Due to the closed nature of the cells, the flame-retarding polyhalogenated fluorocarbons are retained within the microscopic cells within the foamed structure, and thus, at elevated temperatures where the microscopic cells are ruptured, the fluorocarbons are released to act as flame-retarding agents. The foamed structure of fluorocarbon-blown phenolic resins having the closed cell and generally non-porous structure also contributes to inhibiting the spontaneous combustion, since there is a significant reduction of air transmission throughout the foamed structure.

Also apparent from the foams provided herein, is the presence of a high-gloss skin which is free from surface cavities and fractures. The core of the foams of the invention are free of intraspatial voids or holes. This may be due to the inability of the fluorocarbons to pass through the structure during the blowing thereof whereas other organic solvents pass completely through to make large voids and blow-holes in the open-celled structures. However, the advantages secured herein by the fluorocarbon blowing agents provides an increased foam efficiency and a slower, more uniform fluid rise (since pressure and temperature of the exothermic reaction proceeds at a more uniform rate) provides properties heretofore unobtainable in phenolic foams. In addition, a greater latitude in foam density is provided by these agents.

Because of the unique solubility of these agents, the quantity of polyhalogenated saturated fluorocarbons required to produce a given density foam of good texture is less critical, with a much broader range now possible than were the previously employed blowing agents such as with the alklylene halides, alcohols and ethers. In fact, amounts of the fluorocarbon blowing agents up to about 50 parts per hundred parts of phenolic resin can be employed if desired and even such large amounts do not decrease the viscosity of the resole resin. However, such large amounts are seldom needed and amounts of from 2 to 30 parts per hundred parts by weight of the resin are most preferred for the making of foams within the commercially practical range.

As employed herein, the term "polyhalogenated saturated fluorocarbon" means those organic compounds having more than one halogen atom bonded to aliphatic carbon atoms in which at least one halogen is fluorine, and which compound is free of aliphatic and aromatic unsaturation, and is illustrated by the following species shown in Table I.

TABLE I

| Foaming agent: | ° F.[1] |
|---|---|
| Monochlorodifluoromethane | −41 |
| Dichlorodifluoromethane | −21.6 |
| 1,2-dichloro-1,1,2,2-tetrafluoroethane | 38.4 |
| 1,1,1-trichloro-2,2,2-trifluoroethane | 45.8 |
| 1,2-difluoroethane | 50 |
| Trichloromonofluoromethane | 74.8 |
| 1,1,2-trichloro-1,2,2-trifluoroethane | 117.6 |
| 1,1,2,2-tetrachloro-2,2-difluoroethane | 196.7 |
| 1,1,12-tetrachloro-2,2-difluoroethane | 199 |

[1] Atmospheric pressure boiling point.

However, other polyhalogenated saturated fluorocarbons having a boiling point from about −40 to +200° F. can be used alone or in combination with other blowing agents if desired. A plurality or mixture of such fluorocarbons can be employed, if desired, each designed to volatilize at a different temperature so as to give volatilization at its respective different temperature throughout the exothermic curing reaction can be employed to considerable advantage in providing a more uniform quality and density of foam and lower molding pressures and faster cycles. Such a technique of blending two different fluorocarbons of different boiling points provides for stage expansion as "frothing." This feature along with the less fluid rise property has considerable merit for foam-in-place insulation where greater uniformity of cell structure and lower mold pressures and densities are desired.

Also it is observed that blending of different foaming agents, one of which is very low boiling, can provide for a cold rising foam of lower exotherm which can be valuable in certain foam-in-place packaging and encapsulating applications.

The preferred polyhalogenated, saturated fluorocarbons of this invention are those which have a boiling point at atmospheric pressure ranging from about 25° F., to about 130° F., with those having a boiling point from about 70° F. to about 120° F., such as trichloromonofluoromethane, 1,1,2-trichloro-1,2,2-trifluoroethane, being most preferred.

Those fluorocarbons having 2 or more fluorine atoms attached to the same or different carbon atoms of a lower alkane moiety, particularly an ethane moiety, are quite unique in perceptably increasing the viscosity of the resole resin and are thus particularly preferred. It appears that the unique solubility phenomena observed here is due to the fluorines on the saturated halogenated hydrocarbon inasmuch as the other non-fluorinated halogenated hydrocarbons such as methylene chloride, 1,2-dichloroethane and the like do not provide any of the unexpected results noted for the fluorocarbons.

If fluorocarbons which are normally gaseous under ambient conditions are employed, it is advantageous to initially cool the ingredients in the composition or use a pressurized system. This aids in dispersing the fluorocarbon into the resin medium. Pressure is preferred when fluorocarbons having a volatilization temperature substantially less than normal room temperatures are employed; whereas cooling the resin is preferred for those that boil at about normal room temperaure.

It is of course contemplated in this invention that if desired, the fluorocarbon blowing agent can be used with another blowing agent to secure similar effects, whether the other agent is a volatile agent or a decomposing type of blowing agent such as would or could release an inert gas as carbon dioxide, nitrogen or the like.

In the process for preparing the foams, it is only necessary that the fluorocarbon be thoroughly admixed with the phenolic resole resin, in the selected amount sufficient to yield the desired density. If desired, the exotherm sufficient to foam the composition can be initiated by heat alone or more preferably at room temperature by the use of an acidic condensation catalyst. Once started, the foaming goes to completion to fill the confines of the mold or other closed cavity into which it is placed, or foams freely in air without further assistance.

If desired, the foaming can also be initiated by the release of pressure in a pressurized system when the low boiling fluorocarbons are employed or by the reduction of ambient pressure when higher boiling agents are used. This, of course, aids in the "frothing" technique mentioned heretofore for the in-mold or foam-in-place forming of the foams. The use of acidic catalysts are preferred, however, as they are simply admixed with the resin and fluorocarbon blowing agents and will quickly initiate the exotherm for curing the resin and vaporizing the fluorocarbon.

Then phenol-aldehyde condensation products employed in this invention are not narrowly critical and are well known in the art for making phenolic foams. They are commonly called one-step resins or "resoles," being the condensation reaction products of monohydric phenol and an aldehyde. Preferred are the resins of phenol per se and formaldehyde although other phenols such as meta cresol, meta xylenol and the like can as well be employed as can mixtures of phenol and ortho cresol. Similarly, the formaldehydes can be replaced by other aldehydes or aldehydes liberating compounds such as paraformaldehyde, formalin and the like.

The liquid resins are the alkaline-catalyzed condensates which are carried to only a mild state of resinification so that they are normally liquid and generally water-soluble. This is often referred to as the "A" stage of resinification, the "C" stage being the fully cured thermoset resin stage. These are preferred for use in this invention.

As the condensation between the phenol and aldehyde progresses from the liquid low molecular weight resins, the molecular weight of the condensation product increases and the resin exhibits a corresponding increase in viscosity. Since the addition of small amounts of the fluorocarbon blowing agent does not appreciably decrease the viscosity of the liquid resins, the viscosity of the foamable composition is not narrowly critical, but is dependent to a degree on the amount of fluorocarbon agent present. Typical foamable resole compositions employable herein would include those resins which have an initial viscosity of 25° C. ranging from about 200 centipoises to about 300,000 centipoises, with those having a viscosity ranging from about 400 to about 25,000 centipoises being preferred for easiest handling.

Minor amunts of water can be tolerated in these resins although it is preferred that water content be kept to less than 10% by weight of resin.

Advantages are also made of mixtures of several different resole resins in order to control the initial viscosity and reactivity of the foamable compositions. For example, mixtures of a high viscosity and a low viscosity resin have been used to control the ultimate density of the foam, as hereinafter shown. Similarly, mixture of a liquid and a solid resole can be employed to the same effect.

It is contemplated in the invention that any resole resin either initially liquid or made fluid by the addition of any agent or by any techniques can be employed in this invention.

As hereinbefore indicated, the foaming of the compositions can be induced by heat or reduction of pressure alone. However, heat is generally necessary in order to advance the foamed resin to a thermoset state. When the mixture of resole resin and fluorocarbon is formed at room temperature, however, the rate of cure proceeds much to slowly for commercial exploitation unless curing is advanced in an oven. Consequently, it is desirable to foam and cure the compositions in an oven or more preferably to add a catalytic condensation agent. Most suitable illustrative catalytic condensation agents are the strong organic and inorganic acids such as sulfuric acid, hydrochloric acid, phosphoric acid, and like mineral acids, toluene sulfonic, xylene sulfonic, phenol sulfonic and the like for room temperature foaming and curing. Basic and acidic substances such as calcium oxide, diethyl sulfate, sodium sulfite and the like can also be used when mild heat is applied, or mixtures of both acidic and basic agents may be used, the base used to neutralize the acid catalyst in the foam and thus make the cured foam non-corrosive and non-irritating.

Upon the addition of catalytic amounts of the curing agent, the exothermic curing reaction of the condensation takes place of such a magnitude to not only volatilize all the fluorocarbon agent even using the high boiling normally liquid agents, and the water of condensation and/or any water initially present but also to thermoset the resin. The amount of the acidic condensation agent however is not critical and can range from 1 to 30 parts per 100 parts of the resole resin, the amount depending to a significant degree on the strength of the acid. For example, best results seem to be secured with about 10–12 parts of 37% hydrochloric acid, or 12 parts of 50% dilute sulfuric acid, or 10 parts of concentrated xylene sulfonic acid or 20 parts of 70% toluene sulfonic acid, all per 100 parts by weight of the resin. A unique system avoiding the corrosiveness of the foams prepared in now provided with xylene sulfonic acid or toluene sulfonic acid. Foams so prepared are not corrosive to molds even without a neutralizer.

It has also been found that further advantages are secured in this system when a surface active agent also be employed as an additional control over the cell size in the foam. While it has been found that the cell size using the fluorocarbons is very fine, additional improvements in uniformity and size are secured by the use of a surface active agent. Particularly useful are the non-ionic types such as polyethers and polyalcohols, such as condensation products of alkylene oxides (such as ethylene oxide and propylene oxide) with alkyl phenols fatty acids, alkyl silanes and silicones and lke materials, as is exemplified by such products as octadecyl phenol-ethylene oxide, decyl phenol-ethylene oxide sulfate and the low polymers of such materials as polyoxyethylene dodecyl phenol, octyl phenol polyethylene glycol ether, ricinoleic acid polyethylene glycolate, stearic acid polyoxyethylene, glycolates, and similar polyoxyethylated fatty acids and vegetable oils as well as polyoxyethylated fatty acid esters as polyoxyethylene sorbitan monolaurate, polyoxyethylene sorbitan tristearate, polyoxypropylene sorbitan monolaurate, polyoxy(propylene-ethylene) sorbitan monolaurate, and polyoxyethylene sorbitan pentaoleate; polyoxy ethylene sorbitan monopalmitate, and siloxane-oxyalkylene block copolymers such as those containing a Si-O-C linkage between the siloxane and oxyalkylene moieties and those containing a Si-C linkage between the siloxane and oxyalkylene moieties. Typical siloxane-oxyalkylene block copolymers contain a siloxane moiety composed of recurring dimethylsiloxy groups end-blocked with monomethylsiloxy and/or trimethylsiloxy groups and an oxyalkylene moiety composed of recurring ovyethylene and/or oxypropylene groups end-blocked with alkoxy groups. Similarly useful are the quaternary ammonium compounds with at least 2 alkyl groups attached to the nitrogen atom like cetyl dimethyl benzyl ammonium chloride, octadecyl dimethyl benzyl ammonium chloride, octadecanol - 9 - dimethyl ethyl ammonium bromide, and diisobutylphenoxyethoxy ethyl dimethyl benzyl ammonium chloride, and sorbitan fatty acid esters such as sorbitan monolaurate, sorbitan monopalmitate sorbitan monostearate, sorbitan trioleate and like esters.

When present, these surface active agents can be employed in any desired amount depending on what results are desired. They serve to aid the nucleation for generation of smaller and more uniform cells. If the fluorocarbon selected as the blowing agent provides sufficient nucleation sites, very little or no surface active agent is needed. Best results seem to be secured in using amounts from 0.3 to about 5 percent by weight of the agent based on the weight of resole resin with preferred results at between about 0.5 to 3 percent by weight. Certain surfactants may cause collapse of the foam if employed in too great a concentration, and optimum concentration may vary with the individual surfactant selected.

However, when prepared in accordance with this invention, foams of a low density have been made with a much more uniform fine cell structure and also finer cell walls than those prepared using any other blowing agent even when a surfactant is not employed.

Despite the thinner cell walls of the foams of the present invention, they characteristically have a greater resistance to surface friability than have those prepared using other foaming agents. Comparative results between foams prepared by the present invention to those prepared under identical conditions with the exceptions of the catalyst and blowing agent as recorded in Table II. The friability tests were conducted according to ASTM Test Method C-367 with the percent of weight loss being recorded therein. Only the first example is of the present invention, all others are controls for comparsion. In Table II, one part of "Tween 40" surfacant (polyoxyethylene sorbitan monopalmitate) was used. In other tables and examples, either "Tween 40" or Silicone L-530 surfacant was used, both giving equivalent results. The Silicones L-530 is an ethylene oxide-propylene oxide-silicone block copolymer having the empirical formula

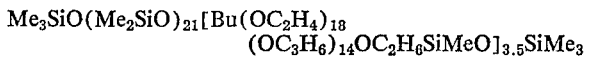

$Me_3SiO(Me_2SiO)_{21}[Bu(OC_2H_4)_{18}(OC_3H_6)_{14}OC_2H_6SiMeO]_{3.5}SiMe_3$ where Me is a methyl group and Bu is a butyl group.

It should be noted from the above table that the first example at a foam density of only 1.0 pound per cubic foot had a weight loss of foam (indicating the degree of abrading caused by the test) of only one-fifth that secured with dichloromethane and one-third to one-fifth the weight loss when diisopropyl ether was used as the foaming agent with hydrochloric acid or sulfuric acid respectively was used as the catalyst. In fact, the 4.0 pound density foam using the diisopropyl ether foaming agent and HCl catalyst and the 5.3 pound density foam using the diisopropylether foaming agent/$H_2SO_4$ catalyst had eqivalent weight loss to the 1.0 pound density fluorocarbon blown foam in the friability tests. The dichloromethane blown foam at a density of 1.8 pounds per cubic foot and the diisopropyl ether blown foam at 1.0 pound density had a friability of 100 percent after only 10 minutes under test indicating complete destruction of the sample.

In all of the above tests, and those shown hereafter, the foams were prepared as described herein, with particular reference to the appended examples. After foaming, the outer portion of the foamed structure was cut away leaving the core center in a cubical form. In Table II, the cubes were 1" each side, with the density calculated in pounds per cubic foot from the weight of this sample. The friability test, according to ASTM Test Method C-367, was run measuring the weight loss in the sample after time intervals of 10 and 20 minutes as noted.

As can also be noted from Table II, blends of different resins have a significant effect on the density of the resultant foam. While that shown in Table II is with a diisopropyl ether foaming agent, the same variation is exhibited with the fluorocarbons as shown in Table III, using 15 parts of 1,1,2-trichloro-1,2,2-trifluoroethane, with different viscosity resins, in each case catalyzed with 10 parts of hydrochloric acid.

TABLE III

| Resin A, Viscosity 2,300-3,000 Centipoises | Resin B, Viscosity 8-12,000 Centipoises | Core Density, lbs./cu. ft. |
|---|---|---|
| 100 | 0 | 1.4 |
| 75 | 25 | 2.5 |
| 50 | 50 | 8.3 |
| 0 | 100 | 16.0 |

The closed cell structure of these resins is demonstrated in significant tests of the water absorption rate of these foams and the lowered volatiles released during and after foaming, as well as by visual observation under high power magnification.

In Table IV, for example 1" x 1" x 3" core sections of foam were kept immersed in water for 24 hours to determine the total water absorbed, in volume percent. One section of a closed cell urethane foam was employed for comparison.

TABLE II

| Phenol-Formaldehyde Resin | | Blowing Agent, Parts by Weight | Acid Catalyst, Parts by Weight | "Tween 40" Surfactant, Parts by Weight | Core Density of the foam in lbs./ft.³ | Percent Weight Loss | |
|---|---|---|---|---|---|---|---|
| Weight, parts | Viscosity, cps. at 25° C. | | | | | After 10 min. | After 20 min. |
| 100 | 2,650 | 1,1,2-trichloro-1,2,2-trifluoroethane (15 parts). | HCl (37%) (10 parts) | 1 | 1.0 | 22 | 47 |
| 100 | 2,650 | Dichloromethane (6 parts)* | $H_2SO_4$ (50%) (13 parts) | 1 | 1.8 | 100 | |
| 100 | 2,650 | Diisopropyl ether (6.6 parts) | HCl (37%) (13 parts) | 1 | 1.0 | 60 | 100 |
| 80 / 20 | 2,650 / 10,000 | ----do---- | HCl (37%) (13 parts) | 1 | 4.0 | 22 | 43 |
| 80 / 20 | 600 / 600 | ----do---- | $H_2SO_3$ (50%) (13 parts) | 1 | 1.0 | 100 | |
| 70 / 30 | 2,650 / 10,000 | ----do---- | $H_2SO_4$ (50%) (13 parts) | 1 | 5.3 | 23 | 45 |

*The maximum amount of this agent that could be incorporated into the composition.

TABLE IV

| Blowing Agent | Catalyst | Core Density, lbs./cu. ft. | Percent Water Absorbed |
|---|---|---|---|
| | | 1.0 | 6.7 |
| 1,1,2-trichloro-1,2,2-trifluoroethane. | HCl | 1.8 | 60 |
| Methylene chloride | H₂SO₄ | 2.5 | 6.0 |
| Diisopropylether (closed-cell urethane foam). | H₂SO₄ | 2.4 | 6.0 |

Thus it is seen that the 1.0 pound foam using the fluorocarbon blowing agent absorbed only one-seventh to one-ninth the amount of water absorbed by the methylene chloride or diisopropyl ether foamed products and about the same amount of water as the 2.4 pound closed cell urethane foam.

On foaming, the fluorocarbon blown foams lose only about 3% by weight of volatiles compared to 4–7% by weight for conventional phenolic foams. As a demonstration, samples of the section, immediately after foaming, measuring 1.5″ x 1.5″ x 3″ were cut, aged at 25° C. and 50% relative humidity and checked for weight loss after 1, 2.5, 5, and 20 hours as shown in Table V following:

TABLE V

| Blowing Agent | Percent | Core Density, lbs./cu. ft. | Weight Loss in Hours Aging | | | | Percent Weight Loss |
|---|---|---|---|---|---|---|---|
| | | | 1 | 2.5 | 5 | 20 | |
| Methylene chloride | 6 | 1.9 | 0.5 | 0.6 | 0.6 | 0.6 | 17 |
| 1,1,2-trichloro-1,2,2-trifluoroethane | 15 | 1.7 | 0.1 | 0.2 | 0.2 | 0.2 | 7 |

Thus it is readily seen from this table, the fluorocarbon blown foam retains a much greater portion of volatiles in the foam than does a methylene chloride blown foam, even though there is more than twice the amount of fluorocarbon present.

The finer cell size and thinner wall sections of the fluorocarbon blown resins is demonstrated by the examples shown in the following Table VI. A 60 power microscope was used to make all foam cell structure measurements of a foam core section cut perpendicular to the foaming direction using a grid with 0.09 mm. divisions and 0.018 mm. subdivision.

TABLE VI

| Parts Resin A* 2,300–3,000 cps. | Catalyst | Blowing Agent | Density, lbs./cu. ft. | Avg. cell size, mm. |
|---|---|---|---|---|
| 100 | 10 pts. HCl | 1,2,2-trichloro-1,2,2-trifluoroethane (10 pts.). | 1.5 | 0.025–0.030 |
| 100 | 10 pts. HCl | Fluorotrichloromethane (5 pts.) | 1.8–2.3 | 0.018–0.030 |
| 100 | 13 pts. H₂SO₄ (50%) | Methylene chloride (6 pts.) | 1.8 | 0.070–0.090 |
| 100 | 10 pts. HCl | Methylene chloride (5 pts.) | 1.8–2.3 | 0.030–0.090 |
| 100 | 13 pts. H₂SO₄ (50%) | Diisopropyl ether (6.6 pts.) | 3.0 | 0.040–0.050 |
| 100 | 10 pts. HCl | Chloroform (5 pts.) | 1.8–2.3 | 0.030–0.090 |

*Containing 1% "Tween 40" (polyoxyethylene sorbitan monopalmitate).

As can be seen from the above Table VI, the fluorocarbons of this invention give a much more uniform and a smaller average cell size than the conventional blowing agents. Much thinner cell walls are observed under the microscope with the wall thickness averaging about 0.003–0.005 mm. for the first two fluorocarbon blown samples and about 0.018–0.020 mm. for the other samples using conventional blowing agents. When observed in a direction perpendicular to the foaming direction, the conventional blowing agents showed severe cell elongation compared to no or very slight cell elongation for the fluorocarbon samples.

It is to be understood that in the foamed resins of this invention, there may also be present other ingredients and agents to impart other desirable properties such as pigments, dyes, fillers such as gypsum, plaster, silica, wood flour and the like, stabilizers, latent neutralizers, flameproofers and like additives without departing from this invention. In fact certain beneficial properties result from many such additives. For example, it has been found that these foams accept and tolerate a high filler loading because of the more efficient fluorocarbon blowing agent. Thus, high concentrations of fire retardants such as chlorinated paraffin waxes, antimony oxide and the like can now be easily accommodated in amounts of 20 to 30 parts by weight resin. Similarly, thermoplastic resins or modifiers such as polyvinyl alcohol, vinyl halide resins, and other similar thermoplastics can be used to improve toughness and other similar properties.

A highly desirable additive to these systems is a glycidyl ether of a polyhydric phenol, preferably one normally liquid or at least fusible at a temperature below the curing temperature of the phenolic resin in the foam These glycidyl ether epoxy resins are well known in the art, generally being prepared by the alkaline catalyzed reaction of epichlorohydrin or similar glycidyl ether precursor and a polyhydric phenol such as bisphenol A, 2,2-bis(4-hydroxyphenyl)propane, or other similar dihydric phenol. They are also characterized by a structure such as:

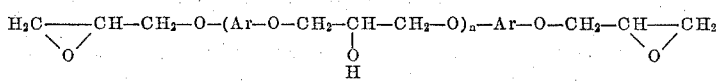

wherein Ar is the aromatic residuum of the dihydric phenol and $n$ is an integer from 0 to 3. The Ar residuum can be, for instance, the disphenylene propane residue of bisphenol A, the diphenylene sulfone of bisphenol S, the tetrachlorodiphenylene propane of the tetrachlorobisphenol A and similar other residues of other dihyric phenols. Any of these can be employed in this invention, preferably in a minor amount compared to the phenolic resin component of the foamable composition, i.e., in amounts up to about 100 parts by weight per 100 parts of resole resin. Any amount can be employed however without departing from the intended scope of this invention, which provides the unusual features discovered herein. For example, an increase in the portion of epoxy resin used in the phenolic foam formulations improves foam resiliency and toughness, and increases the resistance to friability and improves rise efficiency and skin quality. Other advantages are secured in the closed cell content of the foams produced, greater water resistance, higher shear strengths and lower and more stable coefficients of thermal conductivity.

While the phenolic foams per se without the epoxy additive has good adhesion to most substrates in foam-in-place or foam-in-contact applications, these epoxy resin/phenolic resin blends have also been found to provide better adhesion to substrates in foam-in-place applications and also provides a substantially crack-free skin on free foaming. This latter feature is desirable in that a sound crack-free skin provides a good moisture vapor barrier. Cracks often also go into the foam and impair the physical strengths of the foam and may also cause loss of effective bonding strengths.

With or without the epoxy resin additives the foams may be foamed-in-place against a decorative skin of film of another resin, or even against wood or metal surfaces to give firmly adherent laminates for structures as fire doors, building panels and the like where the foam is more than just an insulator in that it also serves to strengthen and rigidify the structure.

For those systems containing a relatively high percentage of epoxy resin, the preferred foaming catalyst is boron trifluoride, particularly as a complex with phenol and stabilized with dipropylene glycol. However, if desired, any conventional oxirane ring opening catalyst can be employed since the exotherm of the epoxy additive on curing is also sufficient to initiate the exotherm for the curing of the resole resin and the foaming of the fluorocarbon.

The boron trifluoride-catalyzed mixtures yield a foam non-corrosive to metals and the high halogen content of the catalyst and the fluorocarbon blowing agent, plus the ability of the foam to be heavily loaded with other flame retardants such as chlorinated waxes, makes this system suitable for applications where greater fire retardance is required.

In formulations containing only small amounts of liquid epoxy resin, strong mineral acids and the various sulfonic acids were found to be more effective as catalysts than the boron trifluoride complex.

With the large potential markets, such as building panel cores and industrial insulation, that exist today for rigid plastic foams, a phenolic/epoxy foam has merit over other foams in the area of cost, heat resistance, moldability, sprayability, dimensional stability, fire resistance, adhesion, and thermal insulation. Also, such a system also has greater latitude in formulating for the properties needed in any given application.

A broad foam formulation for the phenolic/epoxy system is as follows:

| | Parts by wt. |
|---|---|
| Blends of liquid resole resin and liquid epoxy resins (such as the diglycidyl ether of bisphenol A) | 100 |
| Surfactant | 0.5–5.0 |
| Fluorocarbon or blends of the two fluorocarbons | 2–30 |
| Catalyst: | |
|   Dipropylene glycol | 0–10 |
|   BF$_3$-complex (such as BF$_3$-phenol, BF$_3$ etherate, etc.) | 1–20 |

It should also be pointed out that a bulk resin system based on epoxy-phenolic resin blends and catalyzed with a boron trifluoride complex also has potential in laminating, filament winding and industrial bonding applications.

It is also within the concept of this invention to add to the foamable composition of resole resin and fluorocarbon blowing agent other resins and coreactants such as for example, urethane monomers such as polyols and polyisocyanates. Tough and low friability foams also result. With such isocyanates as 2,4 or 2,6-toluene diisocyanate in combination with polyols such as glycerine in this system, a higher closed cell foamed system is secured with a base-catalyzed oven-cured composition. While considerable latitude exists on such urethane modification of these compositions a typical foamable formula could be secured as follows:

| | Parts |
|---|---|
| Resole resin | 100 |
| Surfactant | 2 |
| Fluorocarbon | 2–10 |
| Glycerine or other polyol | 12 |
| 2,4-toluene diisocyanate or other isocyanate | 6 |
| 50% aqueous KOH catalyst | 24 |

Curing of the composition in an oven at 95° C. for several hours provides a good useful foam of 1–3 pounds per cubic foot. Increasing the amount of glycerine to 20–30 parts results in a tougher, denser foam. Increasing the amount of the diisocyanate results in a lighter more friable foam.

Since there is a slight amount of water in the resin and some added in the aqueous catalyst, some of the diisocyanate reacts and releases carbon dioxide that also aids in blowing the foam.

It is, of course, to be understood that any other polyol or other diisocyanate known to produce urethane resins can also be employed in place of those mentioned above since these are not critical in the present invention.

The invention is further illustrated by the following examples which are illustrative only of certain aspects of the invention hereinbefore described in detail. They are not intended to be limiting in any way of the invention described but will serve to illustrate certain preferred embodiments thereof. Unless otherwise mentioned, all parts and percentages hereinbefore and hereinafter used are by weight.

EXAMPLE I

One hundred parts of a water-soluble sodium-hydroxide catalyzed phenol-formaldehyde resole having a viscosity of about 2,600 centipoises at 25° C., one part of surfactant (polyoxyethylene ether of sorbitan monopalmitate), 15 parts of 1,2,2-trichloro, 1,1,2-trifluoroethane and 10 parts of 37% HCl were rapidly agitated with a propeller stirrer for about 15 seconds. The composition was visibly more viscous than the resin alone. The composition was then added to a box mold and the mixture began to foam in 50 seconds after initial mixing and was complete in about 90 seconds.

The foam was allowed to cool and was examined. The surface had a high degree of gloss with few surface imperfections. There were no fractures or cavities on the outside or inside of the foam, and the inside was fine uniform closed cells with no large air pockets or blow holes. The cells had an average diameter of about 0.025 to 0.030 millimeter and were all substantially spherical in shape. The foam core had a density of 1.0 pound per cubic feet and was quite resistant to surface abrasion. Its weight loss after 10 minutes to the surface friability test ASTM D-634 was only 22%.

EXAMPLE 2

To one hundred parts of a phenol-formaldehyde resole resin having a viscosity of 600 centipoises, there was added 3 parts of the surfactant used in Example 1, 5 parts by weight of 1,1,2-trichloro-1,2,2-trifluoroethane and 8 parts by weight of 37% hydrochloric acid which was rapidly stirred and poured into a mold. The mixture foamed within one minute, filling the mold. After cooling, the foam had a core density of 0.2 pound per cubic foot and was a closed fine celled uniform foam.

EXAMPLE 3

Employing the same technique as described in Example 1, a resole of a viscosity of 10,000 cps. was foamed with 15 parts of 1,1,2-trichloro-1,2,2-trifluoroethane, 1 part of surfactant, 10 parts of sodium sulfite as a neutralizing agent, and 10 parts HCl. The foam began 70 seconds after initial mixing and was complete in 180 seconds. Neutralization of the acid is a much slower reaction than is the acid catalysis, enabling the resin to foam and cure under acidic conditions.

The foam had a core density of 16 pounds per cubic foot and was of fine uniform cells. The pH of a foam slurry in distilled water was 7–8 indicating complete neutralization.

EXAMPLE 4

When fluorocarbon blown phenolic foams were tested in accordance with two improvised laboratory fire tests, they were found to be both fire retardant and punk resistant. All foams were prepared in accordance with the procedure of Example I using 100 parts of a resole resin having a viscosity of 2400 to 3000 cps., 1–2 parts of a surfactant (L-530 or Tween 40) and the indicated amount of blowing agent and catalyst as shown in Table VII.

The flame and punking resistance evaluation were made by the following test procedures, using 1, 2 or 3 samples as indicated.

(A) One end of a core foam strip, ½″ x ½″ x 5″ long, is held at an angle of 45 degrees over a Bunsen burner flame so that 1½″ of the 5″ length is exposed, after a specified time, the foam section is removed from the flame and held at the 45 degree incline in a relatively dead air space. The test specimen is observed for open flaming, after glow, and punking (internal burning).

(B) The center of one side of a core foam section, 4″ x 4″ x 1″ thick, is exposed to a Bunsen burner flame for 2 minutes. Upon removal, it is observed for open flaming, after-glow, and punking.

1,1,2-trichloro-1,2,2-trifluoroethane. The mixture was agitated and placed into an open top box mold and heated for 4 hours at 95° C. for forming and curing.

The cured blocks of foam were evaluated for physical properties by taking a 14″ x 2″ x ¾″ sample of the foam core and measuring the flexural strength, deflection and modulus according to ASTM Test D-790-61. Properties are recorded in Table IX.

TABLE IX

| Phr. fluorocarbon | 0 | 1 | 5 |
|---|---|---|---|
| Density, #/cu. ft. | 2.0 | 1.74 | 1.3 |
| Flexural strength, p.s.i. | 22.2 | 17 | 12.8 |
| Deflection | 2.7 | 2.4 | 2.8 |
| Modulus, p.s.i. | 460 | 360 | 270 |

EXAMPLE 7

To one hundred parts of a phenol-formaldehyde resole

TABLE VII

| Foaming Agent | Catalyst | Approx. Core Density, lbs./cu. ft. | Flame Exposure Time, sec. | Test Procedure | Remarks |
|---|---|---|---|---|---|
| Methylene Chloride, 6 phr | 50% H₂SO₄, 13 phr | 2.5 / 2.5 | 15 / 25 | A / A | No open flaming, limited glowing but continued punking for entire length of specimen. |
| Trichlorofluoro methane, 5 phr | 65% phenol sulfonic acid, 15 phr | 2.5 / 2.5 / 2.5 | 25 / 200 / 300 | A / A / A | No open flaming, limited glowing and punking only in 1½″ area of direct flame exposure. No glowing or punking beyond the exposed area. |
| Methylene chloride, 6 phr | 37% HCl, 12 phr | 2.0 | 120 | B | No open flaming, limited glowing but continued punking for entire area of specimen. |
| Trichlorofluoro methane, 5 phr | 37% HCl, 12 phr | 2.5 | 120 | B | No open flaming, limited glowing and punking only in center 2″ diameter area. No sign of glowing and punking in or outside the exposed area after 1-2 minutes. |
| 1,1,2-trichloro, 1,2,2-trifluoroethane, 5 phr. | 37% HCl, 12 phr | 2.0 | 120 | B | |
| 1,1,2-trichloro,1,2,2-trifluoro ethane, 15 phr. | 37% HCl, 12 phr | 1.2 | 120 | B | |

If, however, this level of punk resistance is found to be unsatisfactory in a particular application, then the incorporation of up to 15% of a commercial flame retardant such as "Chlorowax 70S" (chlorinated paraffin wax), or similar material, or "Dechlorane" (perchloropentacyclodecane-$C_{10}Cl_{12}$); "Phosgard C-22R" or tris-2,3-dibromopropyl phosphate will further upgrade the foam's heat and punk resistance.

EXAMPLE 5

A series of phenolic resin foams were prepared having up to 100 parts of epoxy resin (glycidyl ether of bisphenol A, epoxy equivalency of 174-195/g. mol, viscosity of 11,000-19,000 cps.) per hundred parts of phenolic resin, in the manner herein disclosed following the procedure of Example 1. All foams were prepared using 5 to 10 phr. of 1,1,2-trichloro-1,2,2-trifluoroethane blowing agent, 2 parts of surfactant (L-530 or Tween 40) and 100 parts of a phenol-formaldehyde resole resin of a viscosity of about 2400-3000 cps. viscosity. Ratios and catalysts are noted in following Table 8.

TABLE VIII

| Weight ratio phenolic/epoxy | Catalyst, phr | Density, lbs./cu. ft. | Remarks |
|---|---|---|---|
| 100/0 | 50% H₂SO₄, 15 phr | 3.5 | Good rise heavy skin cracking and foam shrinkage. |
| 90/10 | BF₃-phenol complex, 2.5 phr.; dipropylene glycol, 2.5 phr.; xylene sulfonic acid, 5 phr. | | Excellent rise, good texture, very slight skin, cracking and foam shrinkage. |
| 75/25 | (Same as above) | | Good rise and texture, no skin cracking or foam shrinkage. |
| 90/10 | 50% Sulfuric acid (15 parts) | 3 | Good rise and texture, very slight skin cracking and foam shrinkage. |
| 75/25 | do | 1.2 | Very good rise, no skin cracking or foam shrinkage. |
| 50/50 | do | 1.0 | Excellent rise, no skin cracking or foam shrinkage. |

EXAMPLE 6

To one hundred parts of a phenol-formaldehyde resole resin having a pH of 7.8, a solids content of 85.6% and a viscosity of 93,000 centipoises measured at 25° C., there was added 5 parts of 50% aqueous KOH as a catalyst, 12 parts of glycerine, 6 parts 2,4-toluene diisocyanate and 3 parts surfactant (L-530) and the indicated amount of resin having a viscosity of 2,600 cps. at 25° C., there was added 2 parts of the surfactant used in Example 1, 5 parts of trichlorofluoromethane, 25 parts of "Chlorowax 70S" (chlorinated paraffin) and 15 parts by weight of 65% phenol sulfonic acid.

The foam produced had a core density of 3.5 pounds per cubic foot and was a uniform fine closed cell foam.

What is claimed is:

1. A composition suitable for forming an expanded phenolic resin foam of fine cellular structure comprising a liquid phenol-aldehyde resole having a viscosity of from 200 to 300,000 centipoises at 25° C., containing less than 10% by weight of water, and as an essential foaming agent for said liquid resole, a polyhalogenated saturated fluorocarbon having an atmospheric boiling point from about −40° F. to 200° F.

2. The composition of claim 1 wherein the foaming agent is present in an amount from 2 to 50 parts per hundred parts by weight of said resole resin.

3. The foamed and cured composition of claim 1.

4. The composition of claim 1 wherein the phenol-aldehyde resin is a condensate of phenol ($C_6H_5OH$) and formaldehyde, and the fluorocarbon is a liquid having a boiling point between about 25° F. and 130° F.

5. The composition of claim 4 wherein the foaming agent is trichloromonofluoromethane.

6. The composition of claim 4 wherein the foaming agent is 1,1,2-trichloro-1,2,2-trifluoroethane.

7. The foamed and cured composition of claim 4.

8. A composition suitable for forming an expanded phenolic resin foam of fine cellular structure comprising
   (a) one hundred parts by weight of a liquid phenolformaldehyde resole having a viscosity of between 400 centipoises and 25,000 centipoises at 25° C. containing less than 10% by weight water,
   (b) a foaming agent for said resole comprising from 2 to 30 parts by weight of at least one polyhalogenated saturated fluorocarbon having an atmospheric boiling point from about —40° F. to 200° F.,
   (c) from 0.3 to 5 parts by weight of a surface active agent,
   (d) from 0 to 100 parts by weight of a normally liquid glycidyl ether of a dihydric phenol.

9. The composition of claim 8 wherein one of the polyhalogenated fluorocarbons is a liquid having a boiling point between about 25° F. and 130° F.

10. The composition of claim 9 wherein the fluorocarbon is trichlorofluoromethane.

11. The composition of claim 9 wherein the fluorocarbon is 1,1,2-trichloro-1,2,2-trifluoroethane.

12. The composition of claim 9 wherein the glycidyl ether of a dihydric phenol is the glycidyl ether of bisphenol A.

13. The foamed and cured composition of claim 9.

14. A composition suitable for forming an expanded phenolic resin foam of fine cellular structure comprising
   (a) one hundred parts by weight of a liquid phenolformaldehyde resole having a viscosity of between 400 centipoises and 25,000 centipoises at 25° C. containing less than 10% by weight water,
   (b) a foaming agent for said resole comprising from 2 to 30 parts by weight of at least one polyhalogenated saturated fluorocarbon having an atmospheric boiling point from about —40° F. to 200° F.,
   (c) from 0.3 to 5 parts by weight of a surface active agent,
   (d) 10 to 30 parts by weight of a liquid polyol,
   (e) 5 to 10 parts by weight of a polyisocyanate.

15. The method for the production of fine celled phenolic resin foams comprising admixing with a phenol-aldehyde resole having a viscosity from 200 to 300,000 centipoises at 25° C., a foaming agent comprising a polyhalogenated saturated fluorocarbon for said resole resin and having an atmospheric boiling point from about —40° F. to 200° F., initiating the curing exotherm of the resole resin such that the said fluorocarbon is vaporized thereby foaming the composition and curing the foamed composition.

16. The method of claim 15 wherein the curing exotherm is initiated by heating the composition.

17. The method of claim 15 wherein the curing exotherm is initiated by a curing catalyst.

18. The method for the production of fine celled phenolic resin foams comprising admixing in a phenol-formaldehyde resole having a viscosity from 400 to 25,000 centipoises at 25° C. containing less than 10% by weight water, from 2 to 30 parts by weight per hundred parts of said resole of at least one liquid polyhalogenated saturated fluorocarbon soluble in said resole and having an atmospheric boiling point between about 25° F. and 130° F., from 0.3 to 5 parts by weight per hundred parts of said resole of a surface active agent, from 0 to 100 parts by weight per hundred parts of said resole of a liquid glycidyl ether of a polyhydric phenol, and admixing a curing catalyst with the mixture in amounts sufficient to initiate the curing exotherm of the resole resin such that the said fluorocarbon is vaporized thereby foaming the composition and curing the foamed composition.

19. The method of claim 18 wherein two fluorocarbons are employed one of which vaporizes at a temperature less than normal room temperatures and the other of which vaporizes at an elevated temperature.

20 The method of claim 18 wherein the curing catalyst is a mineral acid.

References Cited
UNITED STATES PATENTS 2,744,875  5/1956  Thomas et al. _____ 260—2.5

FOREIGN PATENTS 887,078  1/1962  Great Britain.
937,855  9/1963  Great Britain.

MURRAY TILLMAN, *Primary Examiner.*

SAMUEL H. BLECH, GEORGE F. LESMES,
*Examiners.*

W. J. BRIGGS, *Assistant Examiner.*

UNITED STATES PATENT OFFICE
CERTIFICATE OF CORRECTION

Patent No. 3,389,094                                              June 18, 1968

William J. D'Alessandro

It is certified that error appears in the above identified patent and that said Letters Patent are hereby corrected as shown below:

Column 3, line 34, "The" should read -- These --. Column 5, line 49, "aldehydes" should read -- aldehyde --; line 73, "amunts" should read -- amounts --. Column 6, line 17, "formed" should read -- foamed --; line 19, "to" should read -- too --; line 63, "lke" should read -- like --. Column 7, line 8, "ovyethylene" should read -- oxyethylene --. Columns 7 and 8, TABLE II, second column, line 6 thereof, "600" should read -- 2,650 --. Column 9, TABLE IV, fourth column, line 3 thereof, "6.0" should read -- 40 --. Column 10, line 34, "disphenylene" should read -- diphenylene --.

Signed and sealed this 24th day of February 1970.

(SEAL)
Attest:

Edward M. Fletcher, Jr.                              WILLIAM E. SCHUYLER, JR.
Attesting Officer                                        Commissioner of Patents

UNITED STATES PATENT OFFICE
CERTIFICATE OF CORRECTION

Patent No. 3,389,094                                    June 18, 1968

William J. D'Alessandro

It is certified that error appears in the above identified patent and that said Letters Patent are hereby corrected as shown below:

Column 3, line 34, "The" should read -- These --. Column 5, line 49, "aldehydes" should read -- aldehyde --; line 73, "amupts" should read -- amounts --. Column 6, line 17, "formed" should read -- foamed --; line 19, "to" should read -- too --; line 63, "lke" should read -- like --. Column 7, line 8, "ovyethylene" should read -- oxyethylene --. Columns 7 and 8, TABLE II, second column, line 6 thereof, "600" should read -- 2,650 --. Column 9, TABLE IV should read as follows:

| Blowing Agent | Catalyst | Core Density, lbs./cu. ft. | Percent Water Absorbed |
|---|---|---|---|
| 1,1,2-trichloro,1,2,2-trifluoroethane | HCl | 1.0 | 6.7 |
| Methylene chloride | $H_2SO_4$ | 1.8 | 60 |
| Diisopropylether | $H_2SO_4$ | 2.5 | 40 |
| (closed cell urethane foam) | | 2.4 | 6.0 |

Column 10, line 34, "disphenylene" should read -- diphenylene --.

This certificate supersedes Certificate of Correction issued February 24, 1970.

Signed and sealed this 26th day of January 1971.

(SEAL)
Attest:

EDWARD M. FLETCHER, JR.                      WILLIAM E. SCHUYLER, JR.
Attesting Officer                                Commissioner of Patents